(12) United States Patent
Tsiang

(10) Patent No.: US 7,390,214 B2
(45) Date of Patent: Jun. 24, 2008

(54) WIRELESS BATTERY SNAP

(76) Inventor: Pui Hong Tsiang, Flat C, 36/F, Block 6, Vebena Heights, 8 Mau Tai Road, Junk Bay, Sai Kung, Hong Kong (CN)

( * ) Notice: Subject to any disclaimer, the term of this patent is extended or adjusted under 35 U.S.C. 154(b) by 504 days.

(21) Appl. No.: 11/197,560

(22) Filed: Aug. 3, 2005

(65) Prior Publication Data

US 2006/0028175 A1   Feb. 9, 2006

(51) Int. Cl.
*H01R 3/00* (2006.01)
(52) U.S. Cl. .............................. 439/500; 429/1; 429/96; 429/100
(58) Field of Classification Search ................. 439/500; 429/1, 96–98, 100
See application file for complete search history.

(56) References Cited

U.S. PATENT DOCUMENTS

| | | | | |
|---|---|---|---|---|
| 4,084,037 A | * | 4/1978 | Morton | 429/1 |
| 4,226,497 A | * | 10/1980 | Polonsky et al. | 439/500 |
| 4,239,322 A | * | 12/1980 | Gordon, Jr. | 439/500 |
| 5,186,653 A | * | 2/1993 | Robert | 439/500 |
| 5,312,269 A | * | 5/1994 | Hwang | 439/500 |
| 5,575,682 A | * | 11/1996 | Alexander | 439/500 |

* cited by examiner

*Primary Examiner*—Tho D Ta
(74) *Attorney, Agent, or Firm*—Intellectual Property Law Group LLP; Otto O. Lee; Juneko Jackson

(57) ABSTRACT

A wireless battery snap without any electrical wires leading out and which has at least one button with exposed metal for use in an electrical device for connecting the battery, making it safer in use. The battery snap comprises an insulating support, conductive eyelets, cylindrical socket and plug electrodes, a spring, a contact plate, an insulating sheet and insulating cover. At least two electrode holes and a protruded base, posts and side walls are provided in the insulating support for securing the contact plate, spring, conductive eyelets and insulating cover. The socket and plug electrodes are held onto the battery snap by two conductive eyelets on the insulating support and fastened together with the spring and contact plate. Two button electrodes of the battery disposed on the socket and plug electrodes respectively are connected to the contact plate on the insulating support and spring or two contact poles. An embodiment of the wireless battery snap uses a set of displaceable electrodes of contact with two independent poles in the electrical device. The spring permanently contacts and depresses on one of the electrodes of the device, when the electrode is displaced, the contact plate connects with the other electrode or disconnects apart therefrom, causing electrical current to flow or stop.

10 Claims, 3 Drawing Sheets

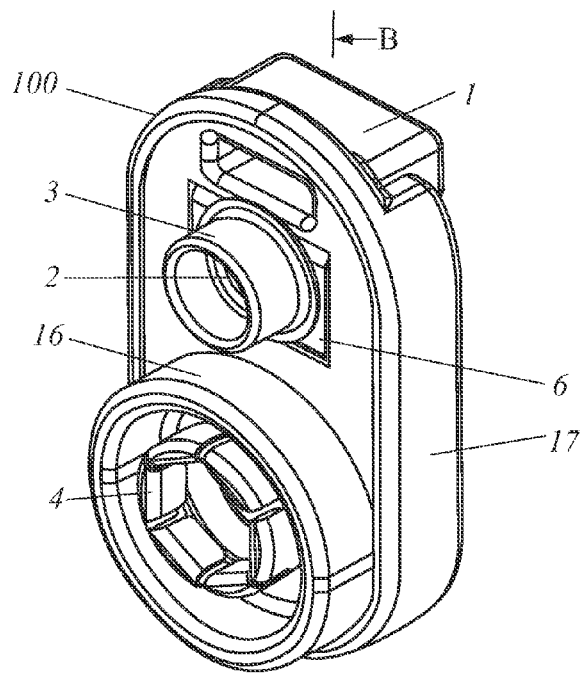
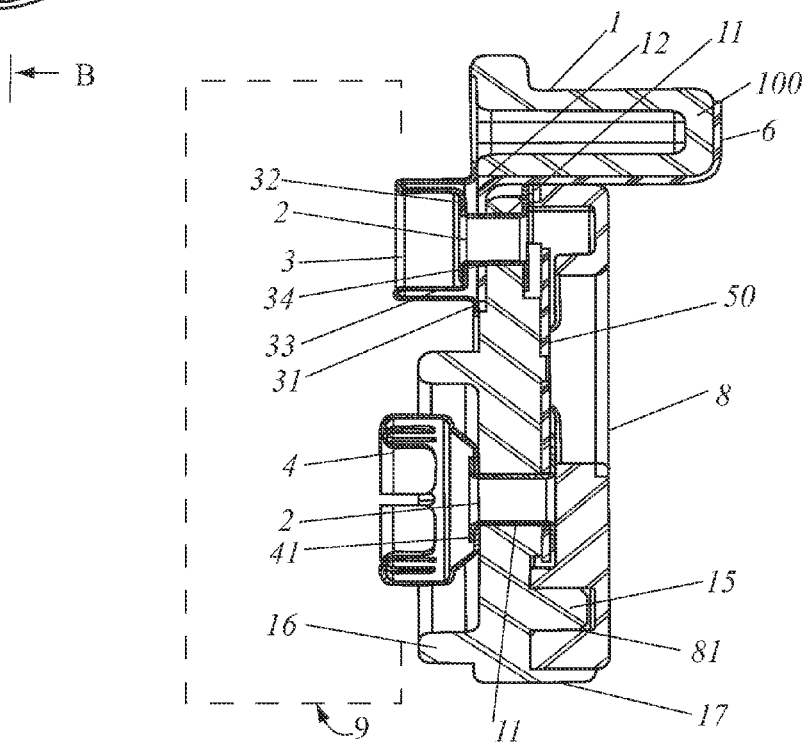

WIRELESS BATTERY SNAP

CROSS-REFERENCE TO RELATED APPLICATIONS

This application claims foreign priority under 35 U.S.C. § 119 to Chinese Patent Application no. 200420077228.2, filed in the People's Republic of China on Aug. 4, 2004, the entire contents of which are hereby incorporated by reference.

1. Field of the Invention

The present invention relates to a wireless battery snap, particularly, one for use in an electrical device for connecting a battery.

2. Background of the Invention

A cylindrical shape rather than a rectangular shape battery is normally used in an electric device as the power supply. One of the reasons being that the electrical wires which protrude from the battery snap make it inconvenient for use. From a technical point of view, the electrical wires which protrude from the battery snap now available in the market may be twisted, stretched and disconnected during use which affect the conductivity of the battery snap. The cylindrical plug and the battery snap socket are exposed and may result in a short circuit causing damage to the electrical device and may result in injury to the user. Generally, a switch for controlling the power supply has to be added to the electrical device.

SUMMARY OF THE INVENTION

The Technical Problem to be Solved

To overcome the limitation of the types of battery that can be used in an existing battery snap, the inconvenience of using a battery snap with protruding electrical wires, exposing the cylindrical plug and battery snap socket which may result in a short circuit as well as the addition of a switch for controlling the power supply, the present invention is created without any protruding electrical wires, which can greatly improve the safety and expand the application of different battery types in use without the need of a switch to control the power supply.

The Technical Solution for Solving the Technical Problem

The wireless battery snap in the present invention comprises of an insulating support, two conductive eyelets, a cylindrical socket and a plug electrode, a conductive spring, a conductive contact plate, an insulating sheet and an insulating cover. In the insulating support there are at least two electrode holes in a formed-shape and a strip in a formed-shape protruding toward the other side and having a slotted base and side walls for securing the conductive contact plate, conductive spring, the eyelets and insulating cover. The cylindrical socket and plug electrodes extend through the two eyelets, conductive spring, and the contact plate to be fastened to the insulating support. The insulating sheet is located between the conductive spring and the other eyelet. The battery used is the type that the two cylindrical button electrodes are on the same plane.

Two button electrodes of the battery are disposed on the cylindrical socket and plug electrodes of the wireless battery snap with one of the cylindrical socket and plug electrodes connected to the contact plate by the conductive eyelets and the contact sheet secured to the flat contact surface formed in the protruded forming slotted base. Another cylindrical socket and plug electrode is connected to the conductive spring and contact plate by the conductive eyelets. The conductive spring or contact plate is disposed in the middle position of two forming electrode holes on the insulating support with the insulating cover fastened to the insulating support.

In use, it is necessary to provide a contact electrode with two independent poles with the two electrodes of the contact electrode connected to the other device. The conductive spring or contact plate of the wireless battery snap permanently contacts and depresses on one of the electrodes of the electrical device. When the electrode is displaced to compress the conductive spring or depresses the conductive contact plate, the other contact sheet of the wireless battery connects with the other electrodes of the electrical device causing the electrical device to be conducted by electrical current. When the contact electrode of the electrical device is displaced in the opposite direction, the conductive spring moves apart from the conductive contact plate and the contact plate of the other electrode of the wireless battery snap disconnects the other electrode on the plane preventing the electrical device from being conducted by current.

In the present invention, a set of batteries is used. The battery and the wireless battery snap must be connected together while the whole circuit is connected in series. The number of the batteries used is determined by the operating voltage required by the electrical device.

Turning on the battery of the present invention is achieved by the variation of the relative horizontal distance between the conductive spring and the contact plate. Two electrodes of the electrical device are secured in parallel on the same plane with one electrode permanently in contact with the conductive spring. When the electrode is displaced vertically to depress the conductive spring, the other electrode is proximate to the flat contact plate of the wireless battery snap resulting in turning on of the battery in the case of contact. Conversely, when the electrode is displaced vertically to release the conductive spring, the other electrode is moved apart from the flat contact plate of the wireless battery snap resulting in turning off of the power supply.

Two sets of cylindrical socket plugs are used. The cylindrical socket plugs are connected by means of a conductive contact plate or conductors. The whole circuit is connected serially or in parallel, and the amount of the cylindrical socket plugs of the battery is determined by the requirement of the electrical device.

The Effects of the Present Invention are as Follows:

A wireless battery snap is provided which eliminates the inconvenience of having protruding wires and is safer in use. Also, use of the conductive spring and contact plate eliminates the use of a switch that reduces the production cost. The conductive spring has the functions of preventing vibration and stabilizing the battery which eliminates the problem of turn-on and impact noise occurring in the case of swing or displacement of the electrical device due to the space in the ordinary battery compartment.

Another effect is to extend the kinds of batteries that can be used by users. Owing to the relatively great capacity of the battery, the life span of the electrical device and the power of the motor can be extended with a lowering in the costs of the battery.

BRIEF DESCRIPTION OF THE DRAWINGS

FIG. 3 is a perspective view of a second embodiment of the invention;

FIG. 4 is the schematic view of the structure taken along B-B line of FIG. 2;

Referring to FIGS. 1-5, the wireless battery snap of the present invention comprises an insulating support 1, a conductive eyelet 2, a cylindrical plug 3 and a socket electrode 4, a conductive spring 5 or a conductive contact plate 50, a contact plate 6 of other electrode, an insulating sheet 7, an insulating cover 8 and a battery 9.

In FIGS. 6 and 7, 1101 and 1102 denote the possible structure of the contact electrode of the electrical device.

DETAILED DESCRIPTION OF SPECIFIC EMBODIMENTS

Figure 1:
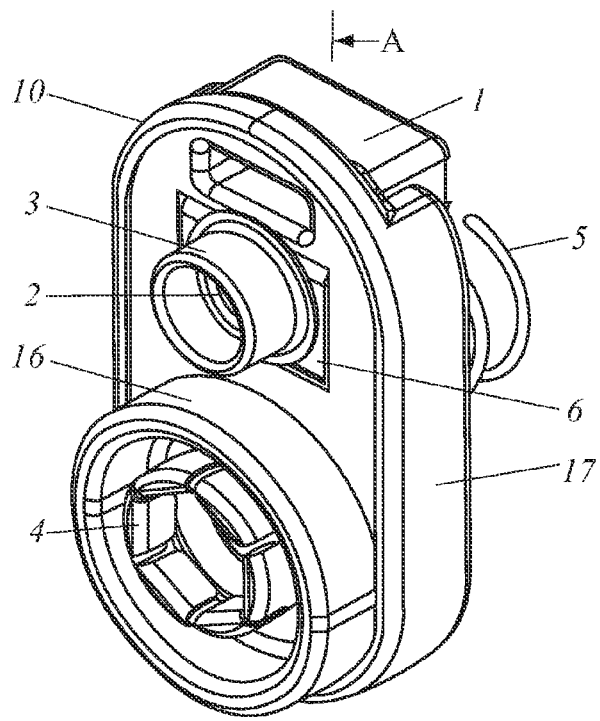
FIG. 1 is a perspective view of a first embodiment of the invention.
Figure 2:
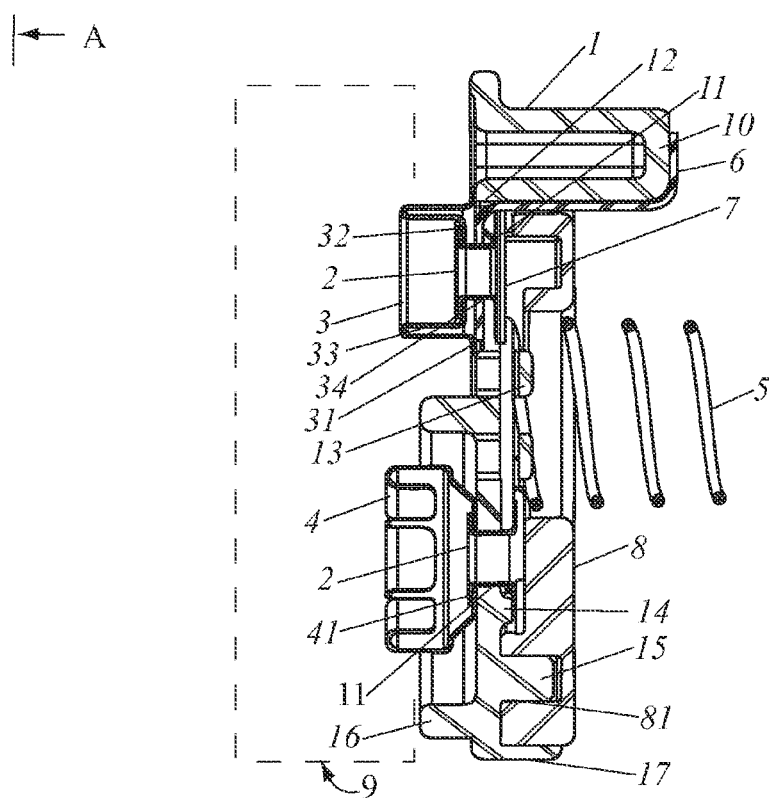
FIG. 2 is the schematic view of the structure taken along the A-A line of FIG. 1.

FIGS. 1-6 show the first, second and third embodiments of the present invention. According to the structure of the invention, the wireless battery snap 10, 100 and 1000 comprises of an insulating support 1, a conductive eyelet 2, a cylindrical plug 3 and a socket electrode 4, a conductive spring 5 or a conductive contact plate 50, a contact plate 6 of the other electrode, an insulating piece 7, an insulating cover 8 and battery 9.

The insulating support 1 is made of insulating materials by means of injection molding. At least two form electrode holes 11 and a formed strip protruding toward the other side having a slotted base 12 and side wall 17 for securing the conductive contact plate 6, conductive spring 5, or conductive contact plate 50, the eyelet 2 and the insulating cover 8 are provided in the insulating support. The cylindrical plug 3 and the socket electrode 4 are extending through two conductive eyelets 2, to connect to the conductive spring 5 or the contact plate 50, then to be fastened to the insulating support 1. The aforementioned points also apply to the schemes 10,100 or 1000.

Two guided protrusions 13 are provided in the insulating support 1. The circular wall 14 with one end opened and two guided posts 15, the center lines of which are the same as the second formed electrode hole 11 are used for fastening the conductive spring 5 or conductive contact plate 50 and the hole 81 of the insulating cover 8. The insulating sheet 7 is disposed in the gap between the conductive spring 5 and the conductive eyelet 2 of the other electrode.

An inner annular formed insulating wall 16 is provided in the electrode hole 11 on the other side of the insulating support 1. The outer annular wall 17 in the outer perimeter of the insulating support 1 is used for receiving the insulating cover 8. The battery 9 is the type that has the two cylindrical button electrodes disposed on the same plane.

Two button electrodes of the battery 9 which are made of conductive materials are disposed on the cylindrical plug 3 and socket electrode 4 of the wireless battery snap. The cylindrical plug electrode 3 extends out horizontally, inwardly 32 and outwardly 31 from the central cylindrical inner hole 33 at the base. A straight hole 34 is formed in the center of the base for extending through the conductive eyelet 2 and then secured. A central straight hole 41 is formed in the cylindrical socket electrode 4 for extending through the conductive eyelet 2 to fasten the insulating support 1, the cylindrical socket electrode 4 and the conductive eyelet 2 together.

The cylindrical plug 3 is connected to the contact plate 6 by means of the conductive eyelet 2, and the contact plate 6 is secured to the flat contact surface formed on the protruded slotted base. The other cylindrical socket plug electrode is connected to the conductive spring 5 or the conductive contact plate 50 by the conductive eyelet 2. The spring is disposed in the middle position between two formed electrode holes provided in the insulating support. Finally, the insulating cover 8 is then fastened to the insulating support 1.

Figure 5:
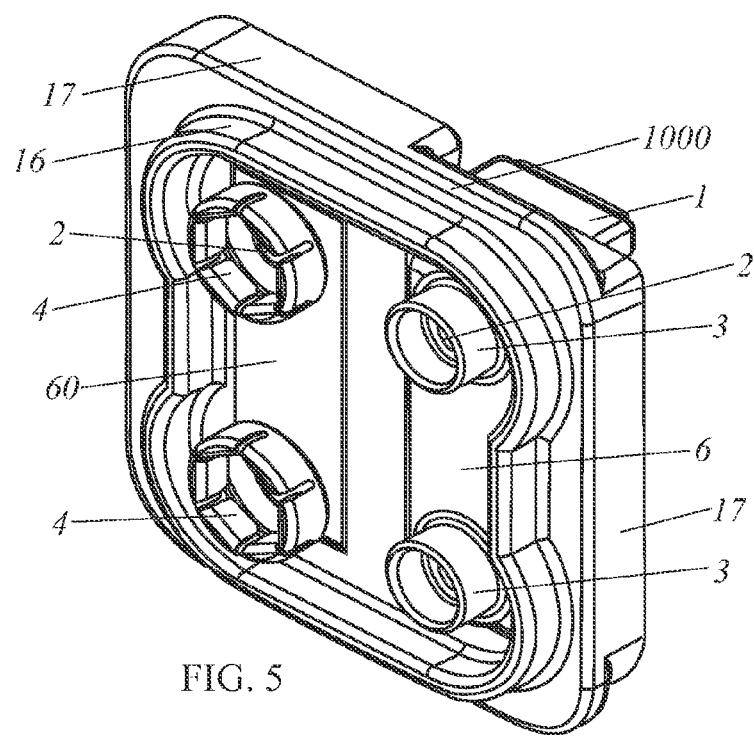
FIG. 5 is a perspective view of a third embodiment of the invention used with multiple batteries.

In FIG. 5, the third embodiment of the invention is shown. In case more than one battery is used, a part of the cylindrical plugs 3 and the socket electrodes 4 in the insulating support 1 is connected serially or in parallel as required by the conductive contact plate or wiring 60.

Figure 6:
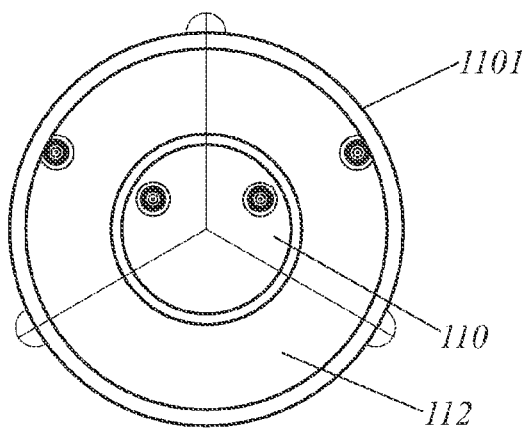
FIG. 6 is the schematic view of the contact electrodes of the electrical device used in the first embodiment of the invention.
Figure 7:
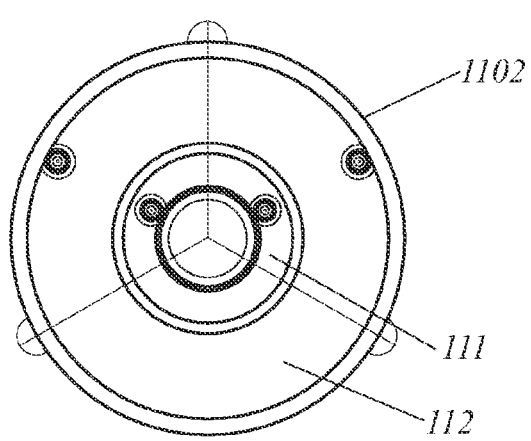
FIG. 7 is the schematic view of the contact electrodes of the electrical device used in second embodiment of the invention.

Referring to FIGS. 6 and 7, it is evident that the invention requires in use a set of contact electrodes 1101 and 1102 with two independent poles. Two poles 110 and 112 or 111 and 112 of the contact electrodes are connected to the other device, respectively. The contact spring 5 or the conductive contact plate 50 of the wireless battery snap permanently contacts and depresses on one electrode 110 or 111 of the electrical device. When the electrode is displaced to depress the conductive spring 5 or 111, the other electrical contact plate 6 of the wireless battery snap is communicated with the other electrode 112 of the device causing the electrical device to be turned on by current.

When the contact electrode of the electrical device is displaced in the opposite direction the conductive spring 6 or 111 springs back, turning the electrode contact plate 6 of the wireless battery snap off and resulting in cutting off the current in the electrical device.

What is claimed is:

1. A wireless battery snap for connection used in an electrical device to connect a battery, with a front side of the battery having two parallel contact ends for contacting a cylindrical socket and a cylindrical plug on a same plane with opposite polarity, the wireless battery snap comprising:

an insulating support made of insulating material with two through holes thereon, a longitudinal central distance of the two holes corresponding to a distance of two electrodes on one end of the battery, a protruded post and a through slot being provided on a plane of one end of the support and near the first through hole for receiving a contact plate while two reversed protruded posts and an open annular wall are provided near the second through hole for receiving a conductive spring, a cylindrical guide post being provided near the second through hole for receiving a guided hole of an insulating cover, an annular outer wall surrounding an outside of the insulating support for receiving the insulating cover, while on a plane of the other end of the support an inner annular wall surrounds the cylindrical socket;

a width of the inner annular wall, along a horizontal axis of the insulating support being shorter than that of the cylindrical socket and plug, while a width of the annular outer wall is shorter than that of the protruding contact plate after assembling;

the contact plate made of a conductive material, one end of the contact plate being inserted into the first through hole from the through slot of the insulating support with the other end disposed on the protruded post to form a contact plane, on another side of the insulating support an end of a first of two inserted conductive eyelets is fastened to the contact plate, the insulating support and the cylindrical socket and plug together;

a threaded hole being formed at one end of the conductive spring, the center of the spring being located between the center of the insulating support and the two through holes, while the threaded hole is disposed on the second through hole of the insulating support, by means of inserting the conductive eyelets, disposing the cylindrical socket and cylindrical plug onto one side of the insulating support, the other end of the conductive eyelets being formed to fasten the conductive spring, insulating support and the cylindrical socket and plug together;

at least one cylindrical plug being connected to a button of an electrode of the battery by means of the first conductive eyelet fastened on the insulating support, the cylindrical plug being formed of a cylinder member outwardly extending from a base with the first through hole in the middle of the cylindrical plug as the first inserted conductive eyelet;

at least one cylindrical socket being connected to a button of another electrode of the battery by means of the second conductive eyelet fastened together with the second through hole in the middle of the cylindrical socket as the second inserted conductive eyelet;

an insulating cover made of insulating material with a central hole in the middle and a guide post and a guide hole nearby, the guide hole being secured to the guide post in the insulating support; after assembling, an outer perimeter of the insulating cover completely surrounding the annular outer wall;

a layer of double-face glue paper being applied to one side of an insulating piece and the insulating piece being applied to the conductive spring and the top of the first conductive eyelet in the contact plate.

2. The wireless battery snap according to claim 1, wherein the at least one cylindrical socket is protected by the surrounding inner annular wall.

3. The wireless battery snap according to claim 1, wherein after assembly, the width of the contact plate along the horizontal axis is longer than the width of the insulating cover and there is a difference in width between the conductive contact plate and the conductive spring.

4. A wireless battery snap, for use in an electrical device to connect a battery, with a front side of the battery having two parallel contact ends for contacting a cylindrical socket and a cylindrical plug on a same plane with opposite polarity, the wireless battery snap comprising:

an insulating support made of insulating material with two through holes thereon, a longitudinal central distance of the two holes corresponding to a distance of two electrodes on one end of the battery, a protruded post and a through slot being provided on a plane of one end of the support and near the first through hole for receiving a first contact plate while the protruded post is provided at the center and an open annular wall is provided near the second through hole for receiving a second contact plate, a cylindrical guide post being provided near the second through hole for receiving a guided hole of an insulating cover, an annular outer wall surrounding an outside of the insulating support for receiving the insulating cover while on a plane of the other end of the support an inner annular wall surrounds the cylindrical socket;

a width of the inner annular wall, along a horizontal axis of the insulating support being shorter than that of the cylindrical socket and plug, while a width of the annular outer wall is shorter than that of the protruding first contact plate after assembly;

the first contact plate made of conductive material, one end of the first contact plate being inserted into the first through hole from the through slot of the insulating support with the other end disposed on the protruded post to form a contact plane, on the another side of the insulating support an end of a first of two inserted conductive eyelets is fastened to the contact plate, the insulating support and the cylindrical socket and plug together;

an aperture formed in the middle of the second contact plate being secured to a central position of the insulating support, another aperture of the second contact plate is provided through each of the inserted conductive eyelets, disposed cylindrical socket and cylindrical plug on one side of the insulating support, while the other end of the conductive eyelets being formed to fasten the conductive spring, insulating support and the cylindrical socket and plug together;

at least one cylindrical plug being connected to a button of an electrode of the battery by means of the first conductive eyelet fastened on the insulating support, the cylindrical plug being formed of a cylinder member outwardly extending from a bottom with the first through hole in the middle of the cylindrical plug as the first inserted conductive eyelet;

at least one cylindrical socket being connected to a button of the another electrode of the battery by means of the second conductive eyelet fastened together with a second through hole in the middle of the cylindrical socket as the second inserted conductive eyelet;

an insulating cover made of insulating material with a central hole in the middle and a guide post and a guide hole nearby, the guide hole being secured to the guide post in the insulating support; after assembling, an outer perimeter of the insulating cover completely surrounding the annular outer wall.

5. The wireless battery snap according to claim 4, wherein the at least one cylindrical socket is protected by the surrounding inner annular wall.

6. The wireless battery snap according to claim 4, wherein after assembly, the width of the contact plate along the horizontal axis is longer than the width of the insulating cover and there is a difference in width between the conductive contact plates.

7. A wireless battery snap, for use in an electrical device to connect a battery, with a front side of the battery having two parallel contact ends for contacting a cylindrical socket and a cylindrical plug on a same plane with opposite polarity, the wireless battery snap comprising:

an insulating support made of insulating material with at least two through holes thereon, a longitudinal central distance of the at least two through holes corresponding to a distance of two electrodes on one end of the battery, the distance across the at least two through holes corresponding to a thickness of the battery, a protruded post and through slot being provided on a plane of one end of the support and near the first through hole for receiving a contact plate while two protruded posts are in a middle position of the insulating support with an open annular wall disposed near the second through hole for receiving the conductive spring, a cylindrical post being provided between the through holes for receiving a guide hole of an insulating cover, an annular outer wall surrounding an outside of the insulating support for receiving the insulating cover, while on a plane of the other end of the support an inner annular wall surrounds the cylindrical socket;

a width of the inner annular wall, along a horizontal axis of the insulating support being shorter than that of the cylindrical socket and plug, while a width of the annular outer wall is shorter than that of the protruding contact plate after assembly;

the contact plate made of a conductive material, one end of the contact plate being inserted into the first through hole from the through slot of the insulating support with the other end disposed on the protruded post to form a contact plane, on another side of the insulating support an end of a first of two inserted conductive eyelets is fastened to the contact plate, the insulating support and the cylindrical socket and plug together;

a threaded hole being formed at one end of the conductive spring, the center of the spring being located between the center of the insulating support and the two through holes, while the threaded hole is disposed on the second through hole of the insulating support, by means of inserting the conductive eyelets, disposing the cylindrical socket and cylindrical plug on one side of the insulating support, the other end of the conductive eyelets being formed to fasten the conductive spring, insulating support and the cylindrical socket and plug together;

at least one cylindrical plug being connected to a button of an electrode of the battery by means of the first conductive eyelet fastened on the insulating support, the cylindrical plug being formed of a cylinder member outwardly extending from a base with the first through hole in the middle of the cylindrical plug as the first inserted conductive eyelet;

at least one cylindrical socket being connected to a button of another electrode of the battery by means of the second conductive eyelet fastened together with the second through hole in the middle of the cylindrical socket as the second inserted conductive eyelet;

an insulating cover made of insulating material with a central hole in the middle and a guide post and a guide hole nearby, the guide hole being secured to the guide post in the insulating support; after assembly, an outer perimeter of the insulating cover completely surrounding the annular outer wall.

8. The wireless battery snap according to claim 7, wherein the at least one cylindrical socket is protected by the surrounding inner annular wall.

9. The wireless battery snap according to claim 7, wherein the width of the contact plate along the horizontal axis is longer than the width of the insulating cover, and there is a difference in width between the conductive contact plates.

10. The wireless battery snap according to claim 7, wherein at least two sets of cylindrical socket are used and the cylindrical socket are connected by the conductive contact plate or conductive wire, while the whole circuit is connected serially or parallelly.

* * * * *